United States Patent

[11] 3,573,401

| [72] | Inventor | Thomas C. Lininger |
| | | New Buffalo, Mich. |
| [21] | Appl. No. | 707,222 |
| [22] | Filed | Feb. 21, 1968 |
| [45] | Patented | Apr. 6, 1971 |
| [73] | Assignee | Electro-Voice, Incorporated |
| | | Buchanan, Mich. |

[54] MICROPHONE STAND
3 Claims, 4 Drawing Figs.

[52] U.S. Cl. ................................................ 179/147,
248/22, 248/121, 248/188.9
[51] Int. Cl. ........................................................ H04m 1/04
[50] Field of Search............................................ 248/121,
160, 188.1, 346, 350, 22, 158, 24, 358; 179/147,
146; 179/146—149, 188.9

[56] References Cited
UNITED STATES PATENTS

| 2,419,153 | 3/1947 | Darr.............................. | 179/146 |
| 2,628,289 | 2/1953 | Olson et al.................... | 179/146X |
| 3,153,123 | 10/1964 | Harman......................... | 179/148 |
| 3,414,686 | 12/1968 | Reinthaler..................... | 179/149 |
| 1,166,487 | 1/1916 | Sherwood...................... | 248/24 |
| 1,771,271 | 7/1930 | Pommer........................ | 248/158 |
| 2,248,068 | 7/1941 | Devore et al.................. | 248/159 |

Primary Examiner—Roy D. Frazier
Attorney—Burmeister, Kulie, Southard & Godula

ABSTRACT: This application discloses a mount for a microphone in which a circular elastomeric body has an annular groove on one side to receive an annular portion of a microphone clamp assembly by simply pushing the annular portion of the assembly into the annular groove. The elastomeric body has a continuous groove in its periphery which engages the edge of a correspondingly dimensioned opening in the base of a microphone stand. A groove is also placed on the opposite side of the elastomeric body to improve shock and vibration isolation. The combination of the clamp assembly, elastomeric body, and the base provides the microphone stand.

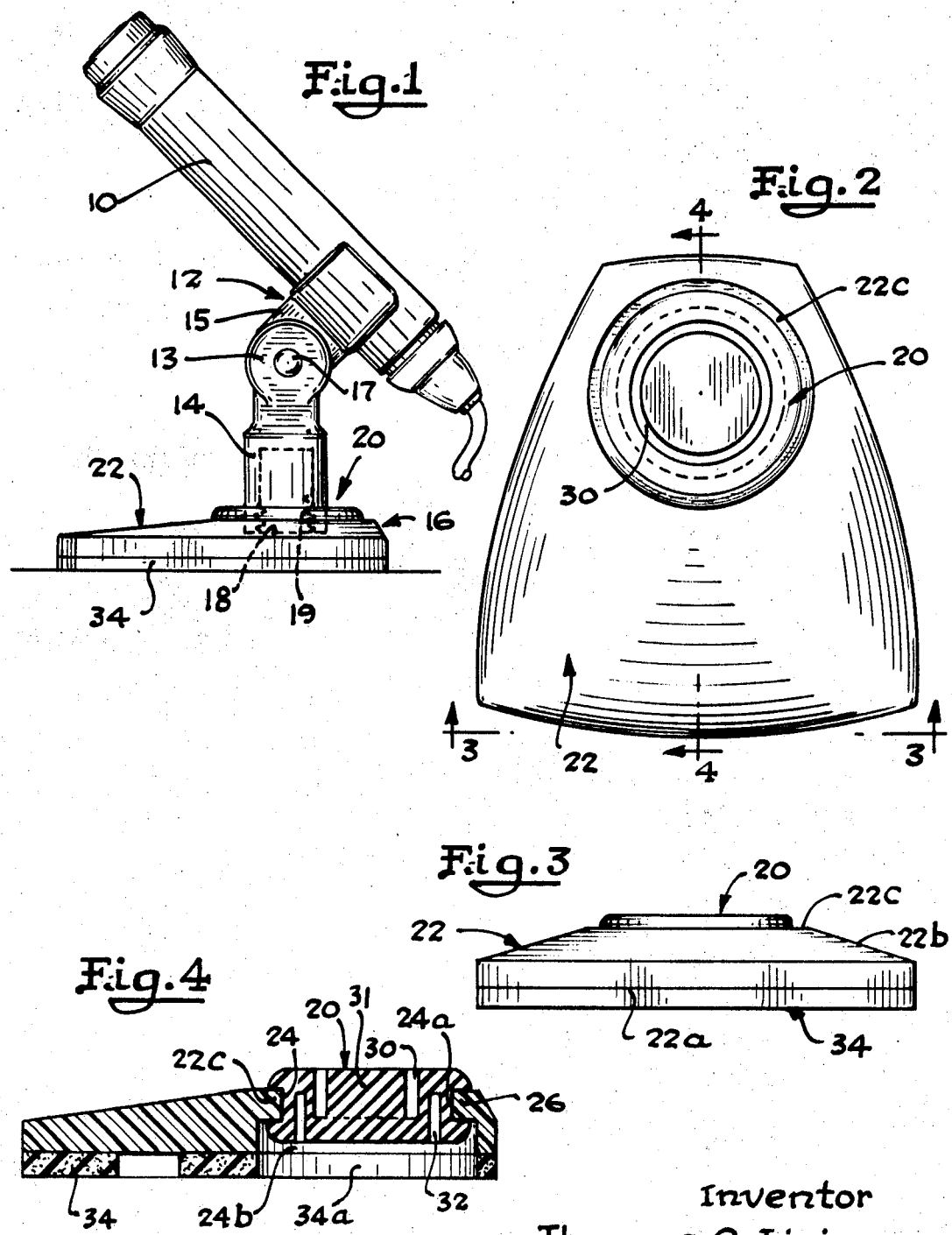

MICROPHONE STAND

This invention relates to microphone stands, and particularly relates to microphone stands which facilitate hand held use of the microphone.

It is conventional to use a microphone as a handheld device and as a stand mounted device seating on some support surface, such as a table or floor. The stand of the present invention is designed for use with a microphone provided with a mounting assembly having a depending stub member or portion, such as the microphone and clamping assembly shown in issued U.S. Pat. No. 2,776,462. Microphone mounting assemblies, such as the foregoing, are conventionally mounted on bases or stands by threadably engaging the stub portion of the mounting assembly with a threaded post extending from the base.

It is desirable to provide a microphone stand which can directly receive the mounting assembly of the microphone by a slip fit mounting so that the microphone may readily be used alternately as a handheld microphone or a stand supported microphone. It is further desirable to provide a stand which is more versatile than prior stands in its adaptability and uses, and which provides shock and vibration isolation between the base and the microphone.

It is accordingly an object of this invention to provide a stand for a microphone in which a mounting assembly of the microphone may be removably secured on the stand without threading the mounting assembly on the stand.

Another object of the invention is to provide a shock resistant mount for a microphone of the type indicated, in which an elastomeric body is engageable and disengageable with a stub member of a microphone assembly by a simple and direct force fit which can be easily executed.

Another object of the invention is a shock isolating microphone stand in which an elastomeric body may serve to effectively support a microphone while still having a high compliance to provide a mechanical structure with a low resonance.

Another object of this invention is a shock isolating microphone stand which is economical to manufacture and is of relatively simple construction while still retaining the desired features of effective shock isolation and the ability to mount microphones having mounting assemblies compatible with conventional stands having threaded posts for engaging the microphone mounting assembly.

Another object of the invention is to provide a microphone stand which can receive in supporting relationship a stub member of a microphone mounting assembly which can also interchangeably be threadably mounted on known and available microphone stands.

A further object of the invention is a shock resistant elastomeric body for a microphone stand which body has a prepared surface to directly and simply receive and release a stub member or portion of a microphone mounting assembly so that the microphone may be used in a handheld manner or on the stand. It is also an object of the invention to provide an elastomeric body of the type described which has another prepared surface which contributes to the low resonance of said elastomeric body, as well as allowing said body to be more easily seated and removed from a dimensioned opening in a microphone base.

Objects such as the foregoing are attained by the invention which will be described, but such invention will attain even other objects which will occur from time to time to practitioners. The following disclosure of the invention includes drawings, wherein:

FIG. 1 is a side elevational view of a microphone with a conventional mounting assembly mounted on the shock resistant stand of this invention;

FIG. 2 is a top plan view of the stand of the invention, on an enlarged scale;

FIG. 3 is an end elevational view along the line 3—3 of FIG. 2; and

FIG. 4 is a sectional view taken along the line 4—4 of FIG. 2.

The use of the same numerals in the various views will indicate a reference to the same structures or elements, as the case may be.

FIG. 1 illustrates a microphone 10 of conventional design with an elongated and generally cylindrical casing. The microphone 10 is shown mounted on a microphone mounting assembly which in this particular embodiment is a pivotable clamp assembly, designated 12, which has a lower hollow cylindrical stub portion or member 14. The stub member 14 is mounted on the shock resistant stand shown generally at 16. As illustrated, the mounting assembly 12 has a bifurcated post 13 which frictionally engages two flat plates 15 between the bifurcations thereof. The plates 15 are pivotally secured on the post 13 by a pin 17, and have contoured surfaces remote from the pin 17 for engaging the cylindrical casing of the microphone 10. It will also be recognized that the present invention may be practiced with the plates 15 integral with or attached to the microphone, or with the microphone casing integral with the stub 14. Reference is made to U.S. Pat. No. 2,776,462 for details of a representative construction of a pivotal clamp.

The present invention utilizes the stub member or portion 14 of the mounting assembly 12 with the stand 16. The lower portion of the stub portion 14 is an open ended hollow cylinder and has internal threads 19 which are adapted to threadably engage a post or nipple on conventional microphone stands, but are not required for practice of the present invention. The stub member 14 has an open lower end designated 18 which may be removably secured on the stand 16, in particular, in an elastomeric body or disc, shown generally as 20.

Reference will now be made to FIGS. 2 through 4 for the details of the microphone stand 16. The stand 16 includes a base 22 which has a planer bottom surface 22a adapted to cooperate with a support such as a table or floor. The top surface 22b is tapered from a flat circular portion 22c. The base 22 has an opening 24 which extends through the top and bottom surfaces of the base 22. The opening 24 is formed by an upper bore 24a communicating with the top surface, and a larger lower bore 24b communicating with the bottom surface. The bores 24a and 24b are cylindrical and concentric. The opening 24 defines a continuous circular inner lip 26 protruding from the base, and the elastomeric disc 20 is dimensioned to be securely seated on the lip 26.

The elastomeric disc 20 is also cylindrical in shape and may be made of rubber or equivalent materials. The disc 20 has a peripheral groove 28 with a rectangular cross section for mounting the disc 20 in the opening 24. The groove 28 has a diameter approximately equal to the diameter of the upper bore 24a and a width approximately equal to the longitudinal axis of the bore 24a in order to permit the groove 28 of the disc 20 to accommodate the lip 26.

The upper surface of the elastomeric disc 20 has a cylindrical recess 30 which is dimensioned to snugly accommodate the stub portion 14 of the mounting assembly. The recess 30 has an outer diameter approximately equal to the outer diameter of the stub 14 and preferably but not necessarily is provided with an axial post 31 to take the form of an annular groove in order to increase the mass of the elastomeric body and lower the mechanical resonance. In addition, the diameter of the post 31 is approximately equal to the inside diameter of the stub 14 so that friction between the inner surface of the stub 14, including friction of the threads 19, and the post 31 aids in securing the mounting assembly on the stand.

The reverse side of the elastomeric body is shown as having an annular groove 32. The inside diameter of groove 32 is greater than the diameter of recess 30, and the groove 32 may have a smaller thickness than the annular groove formed by the recess 30 and post 31, as illustrated, since this groove 32 is solely for increasing the compliance between the mass, represented largely by the microphone 10 and stub 14, and the base 22, thereby lowering the mechanical resonance of the entire assembly. The mechanical resonance of the entire system including the microphone 10, mounting assembly 12 and stand 16 must be below the frequency range of the microphone in order to minimize microphone output responsive to mechanical vibrations impressed on the stand 16. The groove 32 also facilitates the seating of the elastomeric body 20 in the lip 26 by facilitating deformation of the body 20 in order to position the elastomeric body in the opening 24a.

In the illustrated embodiment, the lower side of the disc 20 is disposed within bore 24b and terminates above the bottom surface 22a of the base 22 so as to not interfere with engagement of the flat surface 22a and the flat surface of a table or the like. A frictional or antiskid pad 34 is secured on the bottom surface 22a of the base 20 to provide stable surface contact. The pad 34 is of generally uniform thickness and has a peripheral conformation with the base. The pad 34 may be formed from various materials such as cork or polyvinyl chloride foam fashioned as a flexible friction material. A cutout 34a is shown in the pad 34 and this cutout has a dimension to correspond to the dimension of the larger bore 24b. Cutout 34a allows accessibility to the elastomeric disc to facilitate insertion on the lip 26. The top surface of the pad may have an adhesive film, which may be pressure sensitive or the like, to bond the pad to the base.

The mounting assembly and microphone are securely supportable on the stand, and the mounting assembly and microphone may be quickly and easily demounted from the stand at any time by simply withdrawing the stub member 14 by pulling action to release the engagement in the elastomeric body. It is also to be noted that an important feature of this invention is that resistance to microphone shock is provided by the elastomeric mount. Such a mounting can reduce electrical response to shock or vibration about 4 decibels.

While the microphone may be used manually after removal from the stand, the microphone and mounting assembly may be used on a threaded nipple or post of conventional microphone stands. Such additional choices for a microphone mounting is an advantage because of the versatility which is provided. Such stands may be economically manufactured and therefore a plurality of stands may be provided in a number of locations to provide a large selection of locations where the microphone can be mounted. While the base of the microphone stand may be made from a variety of materials, it is desirable to mold or cast the base from metals or weighted plastics to provide stability.

It will be evident that many modifications may be practices in devising various embodiments of the invention. It is preferred to provide a circular opening 24 for the elastomer disc 20, but the opening 24 may also be in other forms, such as a slot. The elastomeric body 20 may also have different forms, although the recess 30 and annular groove 32 are preferably cylindrical.

The invention may now be practiced in the many various ways which occur to those skilled in this art, and all such modifications in practice will comprise a part of the concept behind the disclosed embodiments.

I claim:

1. A stand for a microphone comprising means adapted to engage and support the microphone having a stub portion extending therefrom, a base having a bottom planar surface adapted to engage a support surface, and a top surface, an opening in said base extending from the top surface, said opening defining an edge in said base, an elastomeric body disposed in said opening and mounted at its periphery therein, said body having two spaced opposite sides, the reverse side being disposed adjacent to the planar side of the base and the obverse side being exposed, said elastomeric body having a recess in said exposed side of approximately the same contour and dimensions as the stub portion, and said stub portion being insertable and removable from the recess, wherein the mass of the microphone and the means for engaging and supporting the microphone and the compliance of the elastomeric body result in a mechanical resonance at a frequency below the frequency response range of microphone, the opening in the base being circular and said opening defining a continuous cylindrical surface in said base with a diameter approximately equal to the diameter of the groove of the elastomeric body, said elastomeric body being mounted in said bore by seating the cylindrical surface of the base in the peripheral groove of the elastomeric body, the recess in the exposed side being an annular groove adapted to engage a matching annular stub portion, and the reverse side of the elastomeric body having a second recess to reduce the compliance of the elastomeric body.

2. A shock resistant microphone mount for receiving a stub portion of a clamping assembly, said clamping assembly being used to engage and support a microphone, and said mount being used for placement in a matching opening in a microphone base, said mount including, an integral elastomeric body, said body having a configuration with dimensions to provide a snap fit of said body in said base opening, a continuous groove in the periphery of said body, said groove having a dimension of width to provide secure mounting of said body in said opening by engaging a continuous edge of said base opening, and a recess in said body having approximately the same contour and dimensions as the stub portion to attain a secure fit when the stub portion is directly inserted into said recess, said elastomeric body being circular and said recess in said one side being an annular groove adapted to engage an annular stub portion, said annular groove having inside and outside diameters with dimensions sufficient to attain a secure fit when said annular stub portion is directly inserted into said recess, said elastomeric body including a second annular groove in the reverse side of said body, said second annular groove having an inside diameter greater than the outside diameter of said annular groove to reduce the compliance of the mount and to facilitate deformation of said body for positioning in said bore of said base.

3. A combination microphone and removable microphone stand comprising, in combination, a microphone, means engaging and supporting the microphone having a stub portion extending therefrom, a base having a bottom planar surface adapted to engage a support surface, and a top surface, an opening in said base extending from the top surface, and said opening defining a continuous cylindrical surface extending from the top surface of said base and said opening having a portion of enlarged diameter adjacent to the bottom surface, thereby forming a lip about the cylindrical surface, a cylindrical elastomeric body having a peripheral groove disposed within the cylindrical surface with the groove engaging the lip of the base, said body having two spaced opposite sides, the reverse side being disposed adjacent to and spaced from the planar side of the base and the obverse side being exposed, said elastomeric body having a recess in said exposed side of approximately the same contour and dimensions as the stub portion, and said stub portion being insertable and removable from said recess, the combined mass of the microphone and the means for supporting the microphone and the compliance of the elastomeric body resulting in a mechanical resonance at a frequency below the frequency response range of the microphone.